T. J. ELLISON.
COVERER.
APPLICATION FILED DEC. 12, 1912.
1,093,773.
Patented Apr. 21, 1914.
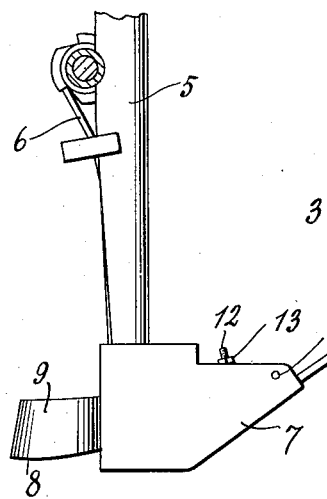
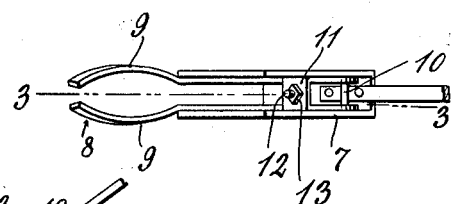
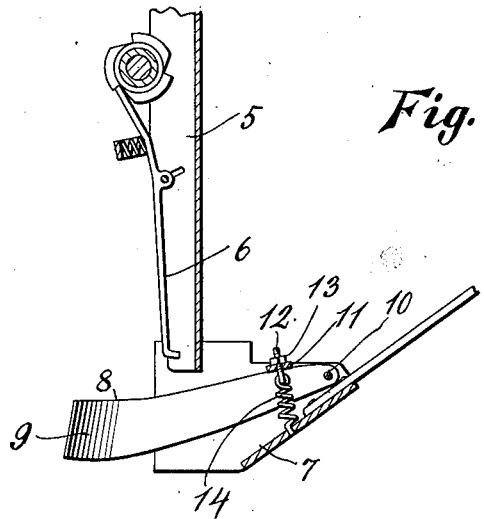
WITNESSES:
INVENTOR
Thomas J. Ellison.
BY
ATTORNEY

UNITED STATES PATENT OFFICE.

THOMAS J. ELLISON, OF TERRILL, KENTUCKY.

COVERER.

1,093,773. Specification of Letters Patent. Patented Apr. 21, 1914.

Original application filed February 1, 1912, Serial No. 674,689. Divided and this application filed December 12, 1912. Serial No. 736,366.

*To all whom it may concern:*

Be it known that I, THOMAS J. ELLISON, a citizen of the United States, residing at Terrill, in the county of Madison and State of Kentucky, have invented certain new and useful Improvements in Coverers, of which the following is a specification.

This invention relates to corn planters of that type disclosed in the application filed February 1, 1912, Serial No. 674,689, of which the present application is a division, the subject matter of the latter relating to the seed covering device.

It is the object of the present invention to provide a seed coverer embodying certain novel features of construction to be hereinafter described and claimed.

In order that the invention may be better understood, reference is had to the accompanying drawing forming a part of the specification, in which drawing—

Figure 1 is a side elevation of the covering device. Fig. 2 is a plan view thereof. Fig. 3 is a longitudinal section on the line 3—3 of Fig. 2.

Referring specifically to the drawing, 5 denotes the seed chute of the machine, the same containing a valve 6 which is periodically opened to drop the seed.

The lower end of the seed chute 5 extends into a furrow opener 7 carrying a drag 8 for covering and packing the seed, said drag comprising two laterally spaced plates 9 which are bowed outward at their rear ends, and connected at their forward ends. The drag is located between the side walls of the furrow opener, and its bowed ends project from the rear end thereof. The front end of the drag is pivoted at the corresponding portion of the furrow opener as indicated at 10, and has a cross bar 11 in which is adjustably mounted a screw stem 12 secured by a nut 13. To one end of the screw stem is connected a spring 14 which is anchored to the furrow opener, and which spring serves to force the drag downward and yieldingly press it into the ground. The tension of the spring may be adjusted by operating the screw stem in an obvious manner.

The furrow opener 7 comprises two spaced side walls which converge at their forward ends, the lower portions being brought to a relatively thin edge so that it may cut into the ground. The furrow opener structure is an ordinary one and nothing is claimed with respect thereto.

I claim:

In a planter, a furrow opener, and a covering device, said device comprising laterally spaced plates pivoted at their forward ends to the side walls of the furrow opener on the inside thereof and a cross bar connecting said plates adjacent to the pivot, a screw stem carried by the cross bar, a nut securing the screw stem, and a spring connected at one end to the screw stem and at its other end to the furrow opener.

In testimony whereof I affix my signature in presence of two witnesses.

THOMAS J. ELLISON.

Witnesses:
S. P. DEATHERAGE,
S. S. PARKER.

Copies of this patent may be obtained for five cents each, by addressing the "Commissioner of Patents, Washington, D. C."